June 28, 1966 — F. H. CHAMBERS ETAL — 3,257,875

TIRE-REPAIR INSERTING TOOL

Filed July 9, 1964 — 3 Sheets-Sheet 1

INVENTORS
FRANK H. CHAMBERS
ELSWORTH L. BEACH
BY MAHONEY, MILLER & RAMBO, ATTYS.
BY

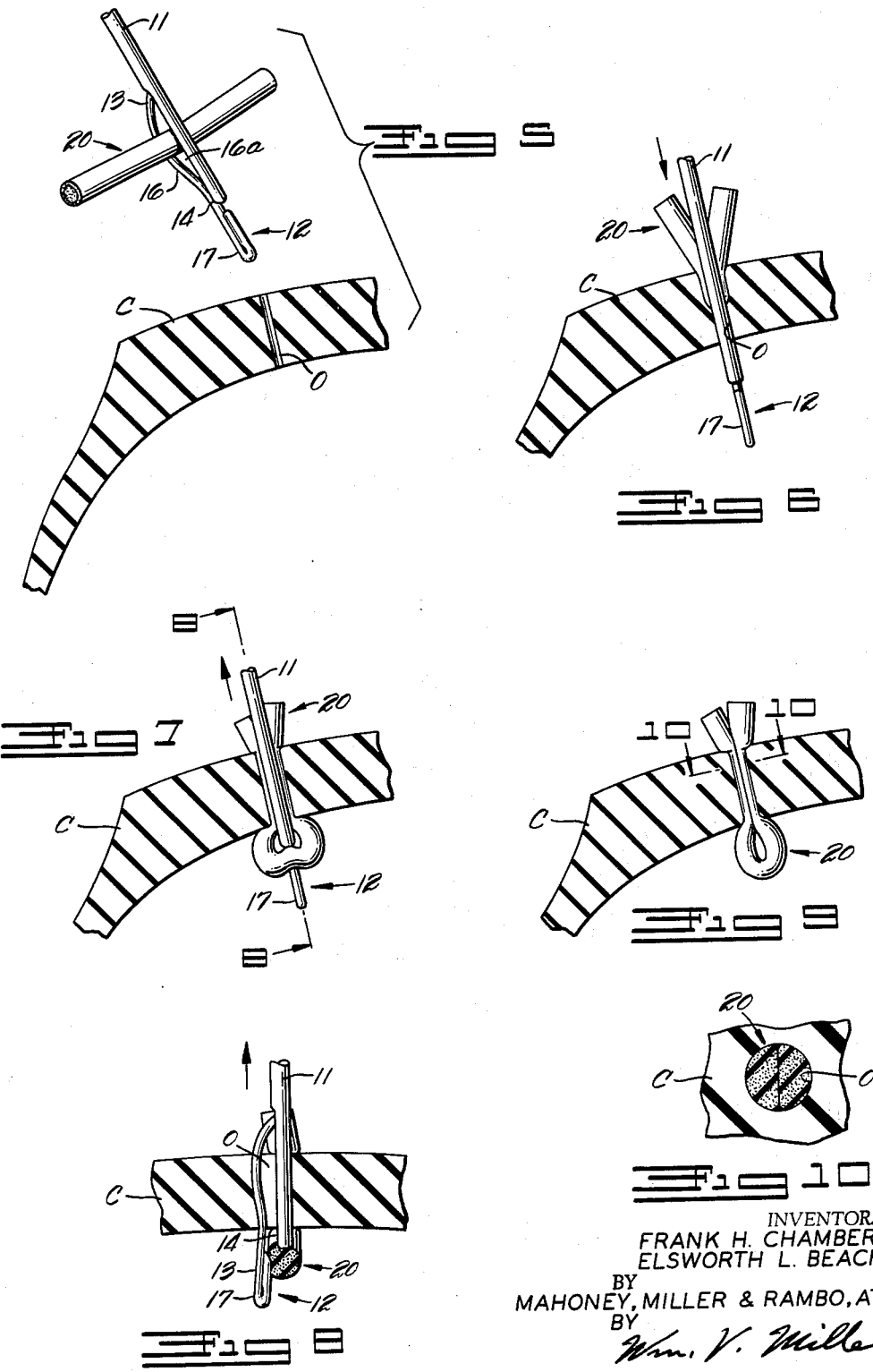

June 28, 1966 F. H. CHAMBERS ETAL 3,257,875
TIRE-REPAIR INSERTING TOOL

Filed July 9, 1964 3 Sheets-Sheet 3

INVENTORS
FRANK H. CHAMBERS
ELSWORTH L. BEACH
BY
MAHONEY, MILLER & RAMBO, ATTYS.
BY
Wm. V. Miller United States Patent Office 3,257,875
Patented June 28, 1966

3,257,875
TIRE-REPAIR INSERTING TOOL
Frank H. Chambers and Elsworth L. Beach, Johnstown, Ohio, assignors to Technical Rubber Company, Inc., Johnstown, Ohio, a corporation of Ohio
Filed July 9, 1964, Ser. No. 381,298
6 Claims. (Cl. 81—15.7)

Our invention relates to a tire-repair inserting tool. It has to do, more particularly, with the provision of a hand tool which is particularly useful in repairing injuries or punctures in tire casings, especially in casings of the tubeless type. The tool provided by our invention is used in inserting the repair, for example, a plug-type repair, from a point outside the tire casing.

Many tools have been provided in the past for this general purpose of inserting tire repairs in an opening or puncture in a tubeless tire casing from a point outside the casing. These prior art tools can be divided into two general classes: (1) One having a closed U-shaped tip and (2) One having an open tip of the button-hook or crochet-needle type. With the first type of tool, it is the general practice to insert the tire-repair or plug transversely in the U-shaped tip of the tool to push it inwardly through the opening completely into the tire casing, and then pull it back outwardly through the opening which doubles it on itself to create a fold in it with a loop on the outside of the tire-casing still engaged by the tool. To remove the tool, it is necessary to sever the loop, leaving the inserted repair divided into two pieces. Sometimes, with this prior art tool, the repair is merely pushed through the opening in doubled condition with the fold innermost at the inside surface of the wall casing and this fold must be severed by manipulation of the tool before the tool can be withdrawn. With the second type of tool, the tire plug or tire repair insert is engaged by the hook and the end of the hook is inserted in the injury opening to force the insert therein with it either in folded or unfolded condition in the opening. By turning and otherwise manipulating the tool, the hook may be released from the repair and the tool may then be withdrawn without cutting or dividing the insert. This tool has the advantage of not requiring severing or dividing of the repair insert but the hook has a tendency to hang onto the wall of the casing, especially onto the reinforcing cords, as it is inserted into and withdrawn from the injury opening and to cause further damage or enlargement of the opening.

The present invention provides a tool which, in general characteristics, is generally similar to the prior art hook-type tool in that it is provided with a split repair insert-receiving and retaining tip end and can be used in inserting the tire repair, either in folded or unfolded condition, without cutting or dividing the repair to permit withdrawal and removal of the tool. However, the split end is so formed that it will not tend to hang onto the tire wall or casing at the injury opening as it is inserted therein or withdrawn therefrom. The tool is further provided with means for insuring that the tool will always be inserted into the injury opening with the split properly located to prevent opening of the split end and displacement of the tire repair insert at the time it is forced into and through the injury opening. Also, although the tool is of novel and effective structure as indicated above, it is still extremely simple and, therefore, a low-cost item.

Various other objects and advantages will be apparent as this description progresses.

In the accompanying drawings, we have illustrated a preferred form of our invention but it is to be understood that the specific form shown is for purpose of illustration only.

In these drawings:

FIGURE 5 is a diagrammatic view illustrating the positioning of the plug-type insert of FIGURE 4 in the split tip of the tool for insertion in folded or doubled condition in the injury opening of the tire casing.

FIGURE 6 is a view similar to FIGURE 5 showing the tool pushing the folded insert into the injury opening of the tire casing.

FIGURE 7 is a view similar to FIGURE 6 showing the folded insert pushed through the injury opening by the tool to its final position and the tool starting to release the insert.

FIGURE 8 is a vertical sectional view taken on line 8—8 of FIGURE 7 showing the tool released from the insert to permit withdrawal of the tool.

FIGURE 9 is a view similar to FIGURE 7 but showing the finally positioned folded insert after the tool is withdrawn.

FIGURE 10 is an enlarged transverse sectional view taken along line 10—10 of FIGURE 9.

Figure 1:
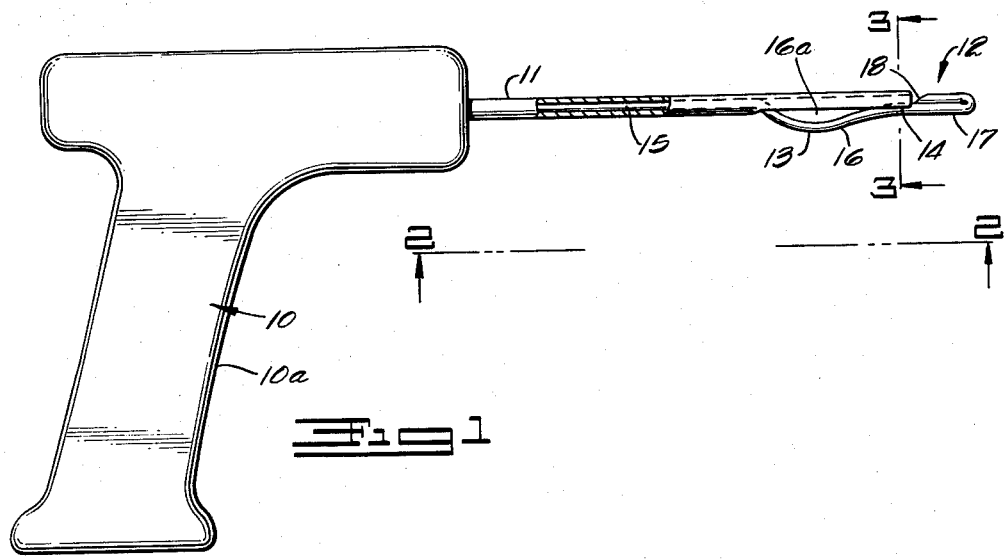
FIGURE 1 is a side elevational view, partly broken away, of a tool embodying our invention.
Figure 2:
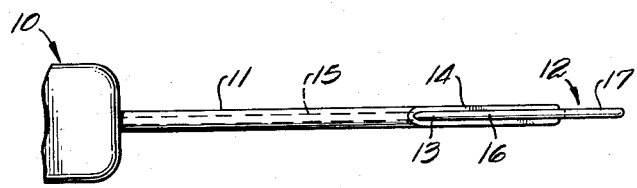
FIGURE 2 is a plan view of the shank portion of the tool taken substantially from the position indicated at line 2—2 of FIGURE 1.
Figure 3:
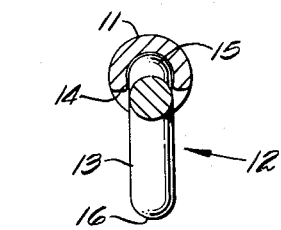
FIGURE 3 is an enlarged transverse sectional view taken substantially along line 3—3 of FIGURE 1 through the split end or tip of the tool.

With reference to the drawings, the tool of our invention is shown in FIGURES 1 to 3 as comprising a pistol-type handle 10 which is preferably of plastic or similar material, and a substantially rigid shank 11 of narrow elongated form carried by the handle and projecting therefrom and which is preferably of steel and which has a split or bifurcated tip end structure 12 at its outer end. The shank 11 is preferably of hollow tubular cross-section as shown.

The bifurcated tip end 12 includes a flexible insert-retaining clip finger portion 13 which is preferably made of steel wire of small cross-section. The outer end portion of the tubular shank 11 has its wall cut out and removed at one side for a substantial extent inwardly from its extremity to form a channel portion 14 which opens downwardly or in the direction of the radial extent of the hand grip portion 10a of the handle 10. The finger portion 13 is provided with a straight inner end 15 which slips inwardly through the cut-out end of the tubular shank 11 into the hollow interior thereof and may be retained therein by a tight fit, by solder or in any other suitable manner.

At the inner extent of the channel 14, the clip finger 13 is bowed outwardly as indicated at 16 to form a socket 16a between it and the channel portion 14 of the shank which is adapted to receive the insert. The clip finger 13 then continues straight outwardly and is adapted to cradle or nest in the channel of the portion 14 as indicated in FIGURE 3, it being noted that the channel is greater than a semi-circle in cross-section and in fact is U-shaped. The straight end of the clip finger is continued outwardly beyond the outer extremity of the shank 11 and is then bent rearwardly or inwardly back on itself. Thus, the tip of the tool is formed by a flat fold or bend 17 which may be soldered if desired to completely close it. The extremity 18 of the wire is beveled to provide a flared mouth at the split between the inner end of the adjacent outer wire and the end of the shank to facilitate insertion of the repair insert in the split tip portion of the tool. It will be noted that the inwardly turned portion of the bend or fold 17 is substantially coaxial with the shank 11 so that when the tool is inserted in the injury opening, the folded or blunt tip end 17 will engage the edge of the opening rather than have that edge engaged by the outer extremity or tip of the shank 11. Thus, there will be no tendency to hang or hook onto the edge. Also, it will be noted that the split or joint between the end of the shank 14 and the end 18 of the finger is on the side (upper side) of the shank opposite to the side (lower side) at which the hand grip 10a is disposed. Therefore, as the fold tip 17 is inserted in the opening, there will be an upward pressure on the clip finger 13 tending to seat its straight end portion more firmly in the channel portion 14.

The tool of our invention may be used for inserting various types of repairs in injury openings in tire casings and especially in casings of the tubeless type. For example, the tool may be used with an insert of the plug type shown in FIGURE 4 which is disclosed in detail in the patent to Chambers et al. No. 2,866,494 of December 30, 1958.

Figure 4:
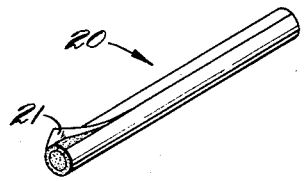
FIGURE 4 is a perspective view of a plug-type repair insert which may be used with the tool.
Figure 11:
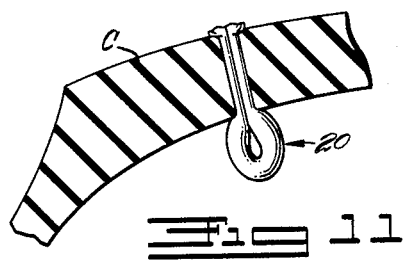
FIGURE 11 is a view similar to FIGURE 9 but showing the trimmed outer end of the insert.

This plug is illustrated at 20 in FIGURE 4 and is covered by a protective wrapper 21 which is first removed and then the plug may be mounted on the tool as shown in FIGURE 5. The plug is disposed transversely under the bend 16 and in the socket 16a of the finger 13 and is gripped thereby against the shank end portion 14. The plug is gripped intermediate its ends as indicated if it is to be folded and doubled when inserted in the injury opening O that extends through the tire casing C. The tool is now inserted with the folded tip or blunt end 17 leading and as the plug engages the outside surface of the casing, it folds back on itself as indicated in FIGURE 6. Because of the positioning of the hand grip 10a of the handle 10, when the fold 17 engages the casing at the opening, the finger clip 13 will be pressed toward the shank end 14 to more tightly grip the plug. In other words, the pressure developed on the tool tip at the time of insertion tends to close the split tool tip rather than to open it. The folded end of the plug eventually passes through the opening as indicated in FIGURE 7, it being understood that the plug is stretched during insertion. Although the end of the plug is looped or folded, as indicated in FIGURE 7, the tool can be released from the fold merely by an outward pull on the tool as indicated in FIGURE 8. This automatically spreads the finger 13 from the shank end 14, it being understood that when the pushing pressure is released on the plug, it expands into tight engagement with the wall of the opening. Also, there will be a sealing enlargement at the inner folded end of the plug. Consequently, the folded plug will not tend to pull out as the tool is withdrawn. When the tool is withdrawn, the doubled plug in the opening will appear as in FIGURES 9 and 10. Its two ends will extend outwardly as indicated in FIGURE 9 and these ends may be cut off so that the final repair will appear as in FIGURE 11.

Figure 12:
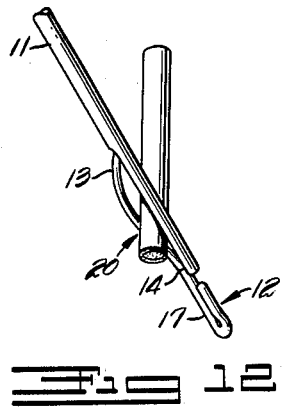
FIGURE 12 is a view similar to FIGURE 5 but showing the plug insert positioned in the tool for insertion into the opening in single or unfolded condition.
Figure 13:
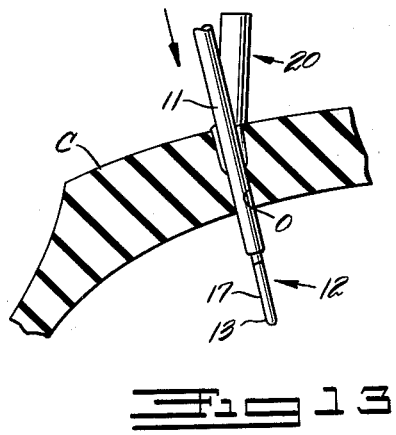
FIGURE 13 is a view similar to FIGURE 12 but showing the tool tip positioned in the opening to push the plug thereinto.
Figure 14:
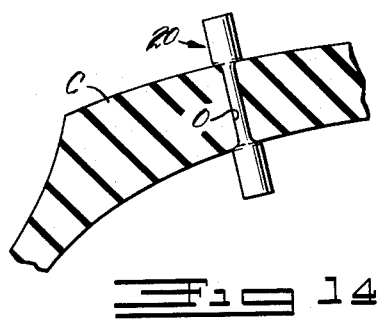
FIGURE 14 is a view similar to FIGURE 13 but showing the plug finally positioned in the opening with the tool withdrawn.
Figure 16:
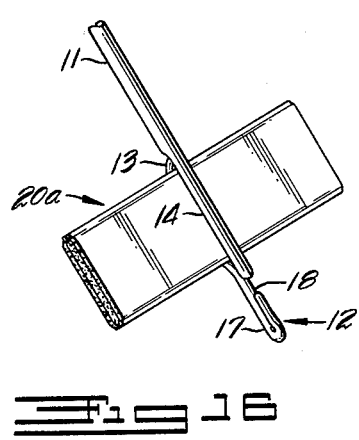
FIGURE 16 is a perspective view showing the insert of FIGURE 15 disposed in the split end of the tool.

If the opening O is relatively small in cross-sectional area, the plug 20 may be inserted without folding. To do this, as indicated in FIGURE 12, the plug will be gripped by the split end of the tool adjacent one end of the plug. Then as indicated in FIGURE 13, it will be pushed into and through the opening and will be stretched as it is inserted. After insertion, the tool may be pulled outwardly automatically releasing the plug and allowing its inner end to expand and retain it in position as indicated in FIGURE 14.

Figure 15:
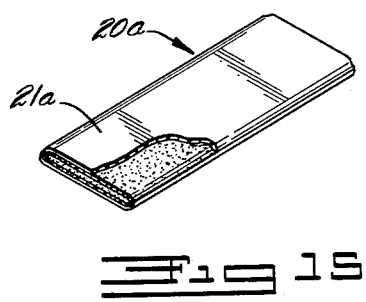
FIGURE 15 is a perspective view, partly cut away, showing a different type of repair insert with which the tool may be used.

Another type of repair insert which can be used is indicated in FIGURE 15 at 20a. This insert may be of the same type disclosed in said patent and specifically shown therein except that it will be of oval transverse cross-section rather than circular. It is provided with a cover 21a which is removed. The plug or strip may be passed laterally of itself through the tool mouth or split at the point 18 beneath the finger clip 13 which will engage and grip it to the shank end 14. The method of insertion may be the same as disclosed in the preceding figures, either in folded or single condition.

It will be apparent that this invention provides a tire repair inserting tool which has a bifurcated tip end. The tip end will receive and firmly grip the insert. The tip is so formed that there will be no tendency for it to catch on the sides of the opening. During insertion of the tool, the pressure developed on the split tip tends to cause it to grip the insert more effectively. The tip itself which engages the casing during insertion is of a resilient yieldable nature and is blunt so that it will not tend to further injure the casing adjacent the opening. After insertion, slight withdrawal pressure on the tool will automatically release the split tip from the insert even if it has a fold or loop therein. Thus, it is not necessary to sever the fold or loop of the insert to withdraw the tool. The tool is very effective, yet it is simple and inexpensive.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described our invention, what we claim is:

1. A tool for use in inserting a tire-repair insert in an injury opening in a tire casing comprising a relatively rigid elongated shank and a resilient insert-engaging clip finger mounted on the shank and extending longitudinally thereof so that it is yieldable relative thereto for receiving and gripping the insert to the shank, said shank having an outer end and said clip finger having an inner end connected to the shank at a point spaced inwardly from the outer end thereof, said clip finger having an outward bow therein inwardly of the outer end of the shank to form a socket between it and the shank for receiving the insert, said clip finger extending beyond the outer end of the shank and having an extreme end turned inwardly on itself toward the outer end of the shank with an extremity adjacent said end.

2. A tool according to claim 1 in which said extremity is beveled to form a diverging mouth to facilitate insertion of the tire repair insert.

3. A tool according to claim 1 including a pistol-type handle for said shank which has a hand-grip extending radially in a direction opposite to the direction in which the extreme end of the clip finger is turned.

4. A tool according to claim 1 in which the outer end of the shank is U-shape in cross-section to provide a channel and the adjacent end of the clip finger nests in the channel.

5. A tool for use in inserting a tire-repair insert in an injury opening in a tire casing comprising a relatively rigid elongated shank and a resilient insert engaging clip mounted on the shank and extending longitudinally thereof so that it is yieldable relative thereto for receiving and gripping the insert to the shank, said shank having an outer end and said clip finger having an inner end connected to the shank at a point spaced inwardly from the outer end thereof and having an outer end extending beyond the outer end of the shank and having an outward bow therein inwardly of the outer end of the shank so as to form a socket between it and the shank for receiving the insert, and a blunt tip on the outer end of the clip finger including an enlargement thereof substantially coaxial with the end of the shank and forming therewith a radially outwardly opening mouth for insertion of the tire repair insert into the socket between the clip finger and the shank.

6. A tool according to claim 5 in which the shank is carried by a handle having a hand-grip extending radially therefrom in a direction diametrically opposite to the direction of opening of said mouth.

References Cited by the Examiner
UNITED STATES PATENTS

| | | | |
|---|---|---|---|
| 574,709 | 1/1897 | Calkins | 81—15.7 |
| 684,647 | 10/1901 | Madsen | 81—15.7 |
| 2,601,455 | 6/1952 | Porter | 294—99 |
| 2,866,494 | 12/1958 | Sanderson | 81—15.7 |

WILLIAM FELDMAN, *Primary Examiner.*

OTHELL M. SIMPSON, *Examiner.*